Figure 1:
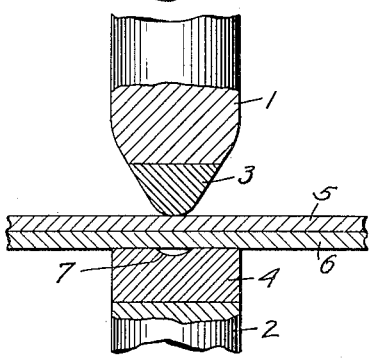

March 7, 1933.  M. J. COHAN  1,900,161

SPOT WELDING

Filed Feb. 15, 1930

INVENTOR.
Morris J. Cohan,
BY Lewis J. Doolittle
ATTORNEY.

Patented Mar. 7, 1933

1,900,161

UNITED STATES PATENT OFFICE

MORRIS J. COHAN, OF BROOKLYN, NEW YORK

SPOT WELDING

Application filed February 15, 1930. Serial No. 428,716.

The object of this invention is to adapt an electric welding process known as "spot welding", used in connection with iron and steel sheets, for use, commercially, with non-ferrous metals, such as extruded or rolled brass and bronze, aluminum, etc.

Spot welding of sheet iron or steel is accomplished by passing a current through a limited localized section of the metal from two electrodes on either side thereof which are under relatively high pressure. The resistance of the iron to the passage of the current causes the same to be heated and the metal welded together between the electrodes.

To adapt this process to the welding of non-ferrous metals, such as brass or bronze, presents many difficulties which have heretofore made it practically impossible, commercially, to utilize this simple method of joining two or more pieces of such material, particularly if of greater thickness than 0.5 mm., for the reason that such metals are of high electrical conductivity and present relatively small resistance to the passage of the electric current and, consequently, do not become heated to a sufficient degree to form a weld with a current which would produce the result with iron. Also, these metals are better heat conductors and tend to dissipate the heat from the localized area between the electrodes.

Furthermore, such non-ferrous metals pass from the solid to the semi-molten condition much more quickly, i. e., within a much smaller range of temperature, than iron or steel.

Attempts to overcome these difficulties by merely increasing the current passing between the electrodes have not proved successful, commercially, as the necessary increased current caused heating and partial melting of the electrodes, which are usually of copper, causing a "mushrooming" of the ends and destruction of the same.

The present invention is the result of many experiments and long study of the problem, as a result of which it was determined that an increased current, over that required for iron or steel, which is automatically controlled as to amount and time applied, could be successfully used by providing electrodes especially constructed for good electrical conductivity and with their contacting ends of a hard, wear-resistant quality and high melting point, shaped to prevent distortion of the metal to be welded. By means of an adjustment of the pressure between the electrodes two or more sheets of bronze or brass each of a thickness of one-quarter of an inch can be successfully "spot welded", as applicant has accomplished in actual commercial work on various structures, by the use of his invention.

This makes possible, as a new article of manufacture, spot welded structures, such as door and window frames and trims, office fixtures, doors, etc., of brass, bronze, etc. This not only materially reduces the cost of production of the same but makes possible a structure of improved appearance and greater durability, due to the parts being permanently joined without the use of unsightly screws, rivets, etc., which have tendency to become loose in use, and the parts are not joined as an integral structure.

In the drawing accompanying this application I have shown illustrative forms of some of the many kinds of such structures illustrating the method of joining the parts. The drawing also illustrates the method of forming the spot weld in two sheets of bronze or brass, or other non-ferrous metal, and shows the construction and shape of the specially formed electrodes, all of which will be more fully set forth hereinafter in connection with the description of the illustrations of the drawing.

Figure 2:
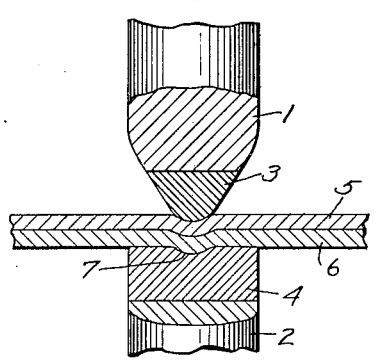
Figure 3:
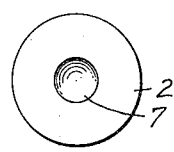
Figure 4:
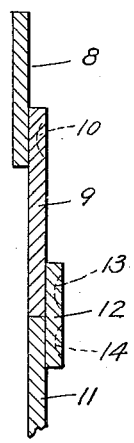
Figure 5:
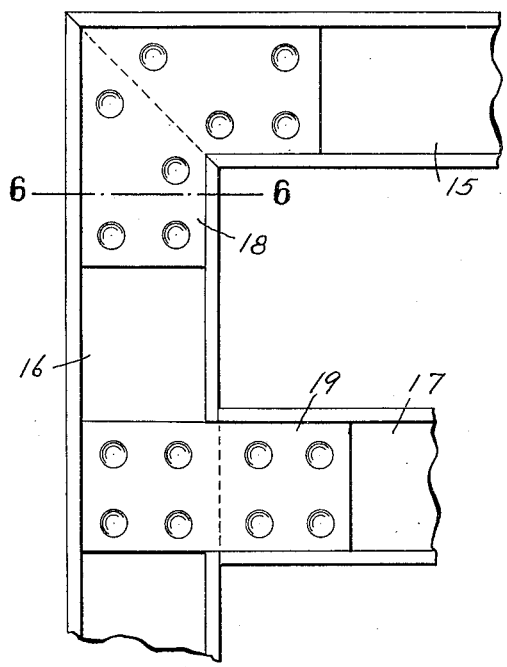
Figure 6:
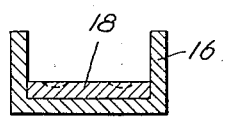

Fig. 1 is a section showing the sheets in position between the electrodes ready to form the weld; Fig. 2 is a similar view showing the weld being formed; Fig. 3 is a plan or top view of the contacting end of one of the electrodes; Fig. 4 is a section showing several forms of welded joints in a structure such as may be formed by this invention; Fig. 5 is a view of one form of structure or frame illustrating the invention as applied to different forms of joints; Fig. 6 is a section on the line 6—6 of Fig. 5.

In Figs. 1 and 2, the electrodes are shown at 1 and 2, the machine and means for supplying the current are not shown as the same do not form a part of the present invention and are of known construction generally. The electrodes 1 and 2 are provided with contacting ends, 3 and 4, respectively, of a hard, wear resisting material having the necessary strength and high melting point to prevent it from "mushrooming" or becoming distorted under the heat and pressure to which they are subjected when in use. The body portions, 1 and 2, of the electrodes are usually of copper. These contacting ends, 3 and 4, may be of an alloy composed principally of copper and tungsten, in proportions determined by the conditions of use, such as the pressure, current, etc., to give the required hardness, strength or resistance to distortion under heat and pressure, etc., requisite for these contacting ends when in operation and engaged with the sheets to be welded, these sheets being illustrated at 5 and 6 in Figs. 1 and 2.

The upper electrode 1 is preferably provided with a tapering, rounded contacting end, to concentrate the current at a localized area, while the lower electrode 2 is provided with a generally flat contacting surface on the contacting end 4, and may also be provided with a concaved portion, indicated at 7, located opposite the contacting end 3 of the upper electrode 1.

The purpose of this concaved portion 7 is to permit the metal to be forced slightly outwardly when pressure is applied and the weld made, the metal being extremely hot. Upon cooling, the contraction draws the protruding metal back so that a practically flat surface is presented on this side of the structure, or possibly leaving a small protrusion which may be readily polished off to provide a continuous smooth surface, which is important in the finished structure, as will be readily understood. This is shown in Figs. 4 and 6.

In Fig. 1, the sheets are in position ready for the welding operation and in Fig. 2 the weld has been—or is being made, the metal of the sheets 5 and 6 being shown as forced slightly downwardly, or outwardly, by the upper electrode into the depression 7 of the lower electrode. Upon cooling, the shrinkage causes this protrusion to recede and leave a substantially smooth plane surface on that side of the structure, as heretofore explained.

The slight depression caused on the opposite side of the structure is not objectionable as the parts are placed between the electrodes so that the exposed surfaces of the finished structure are on the lower side and when the weld is completed this side will be smooth, as described. It will be understood that the terms "upper" and "lower" are used in the relative sense only in connection with the arrangement of the parts as illustrated in the drawing.

As illustrative of the structures to which this invention may be applied, I have shown in Fig. 4 a section illustrating several forms of welded joints. The members 8 and 9 are overlapped at their edge and spot welded at any required number of points, as indicated at 10, in the manner described. Also, two abutting members 9 and 11 with a plate 12 positioned over the abutting edges may be similarly spot welded into one integral structure, the welds being indicated at 13 and 14.

In Fig. 5 another form of structure is shown illustrating the invention as applied to a metal frame of non-ferrous material, such as bronze, etc. The corner members 15 and 16 and a cross member 17 are permanently united in one structure by means of the angle plate 18 and the strip 19 which are spot welded in the manner described over the abutting ends of the members 15 and 16 and the members 16 and 17, respectively. It will be understood that these members 15, 16 and 17 are shown as of "channel" construction for illustrative purposes only, also shown in section in Fig. 6, and it will be obvious that the same may be of any required construction and arranged in any desired shape, other than the rectangular form shown, to meet the requirements and conditions for the use of the same, as stated in the first part of this specification.

What I claim as new and desire to secure by Letters Patent is:—

1. That process of spot welding a pair of superposed contacting work pieces by pressing the work sheets together at a definite locality and passing through the locality from one piece to the other an electrical current of sufficient amperage and for a sufficient time to weld the contacting portions together at the spot, which is characterized by the step of forming, simultaneous with the welding, a protrusion on one of the work pieces of such dimensions that contraction during cooling will render the surface of the metal protruded coplanar with the surrounding metal.

2. That process of spot welding a pair of superposed contacting work pieces which consists in placing the pieces between a pair of welding electrodes shaped to provide a protrusion of the metal on one sheet when pressed together, causing current to flow between the electrodes of sufficient amperage and for a sufficient time to heat the metal between the electrodes to a welding heat, and exerting sufficient pressure on said electrodes during the welding to effect a protrusion on one of the work pieces of such dimensions that contraction during cooling will render the protruded portion and surrounding metal coplanar.

Signed at Brooklyn, New York city, in the county of Kings and State of New York, this 13th day of January, A. D. 1930.

MORRIS J. COHAN.